Figure 1:
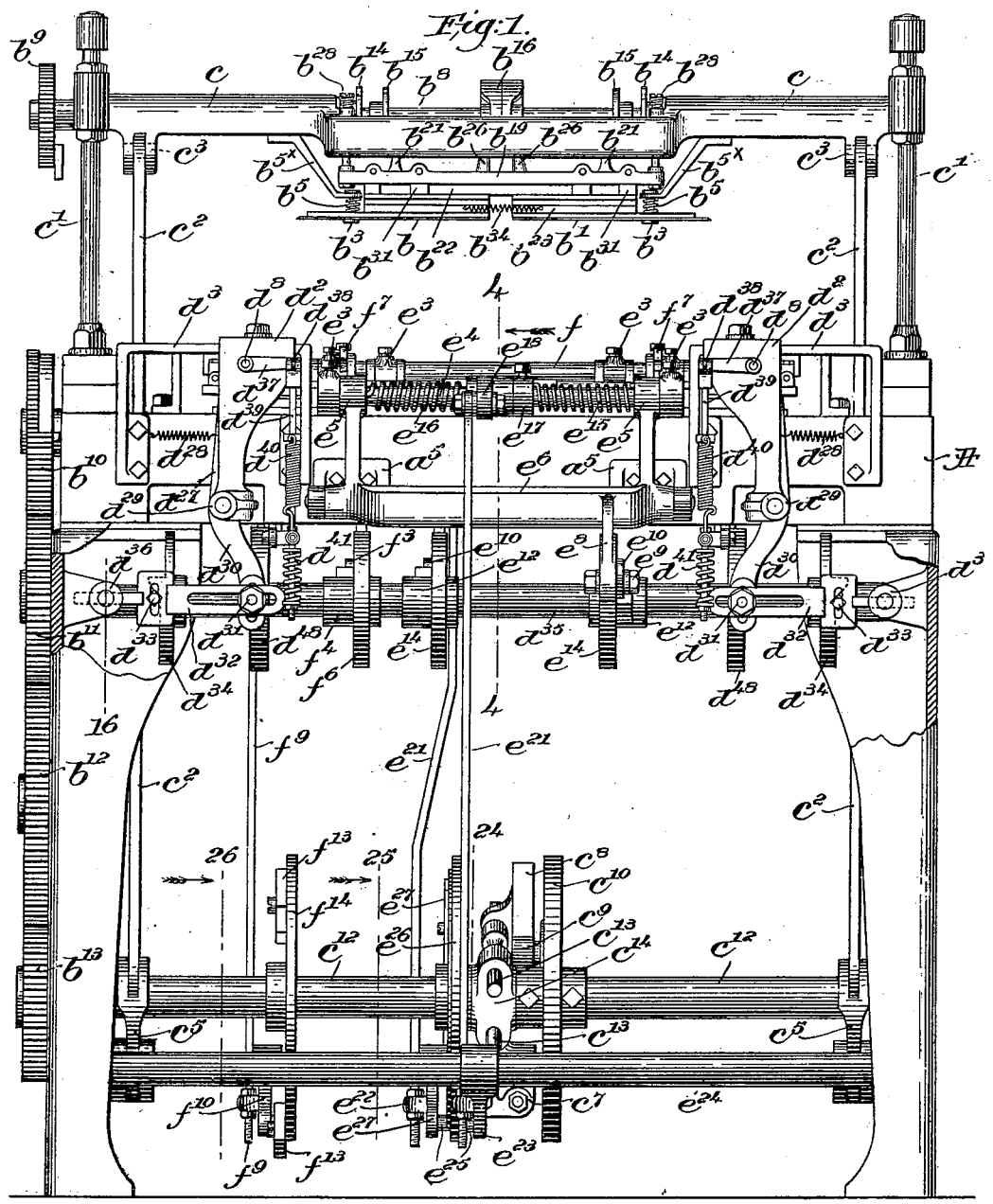

No. 667,207. Patented Feb. 5, 1901.
A. D. FENWICK.
FOLDING MACHINE FOR COLLARS, &c.
(Application filed Dec. 20, 1898.)
(No Model.) 10 Sheets—Sheet 1.

Witnesses,
Edward F. Allen.
Fred S. Greenleaf.

Inventor,
Albert D. Fenwick,
by Crosby & Gregory,
Attys.

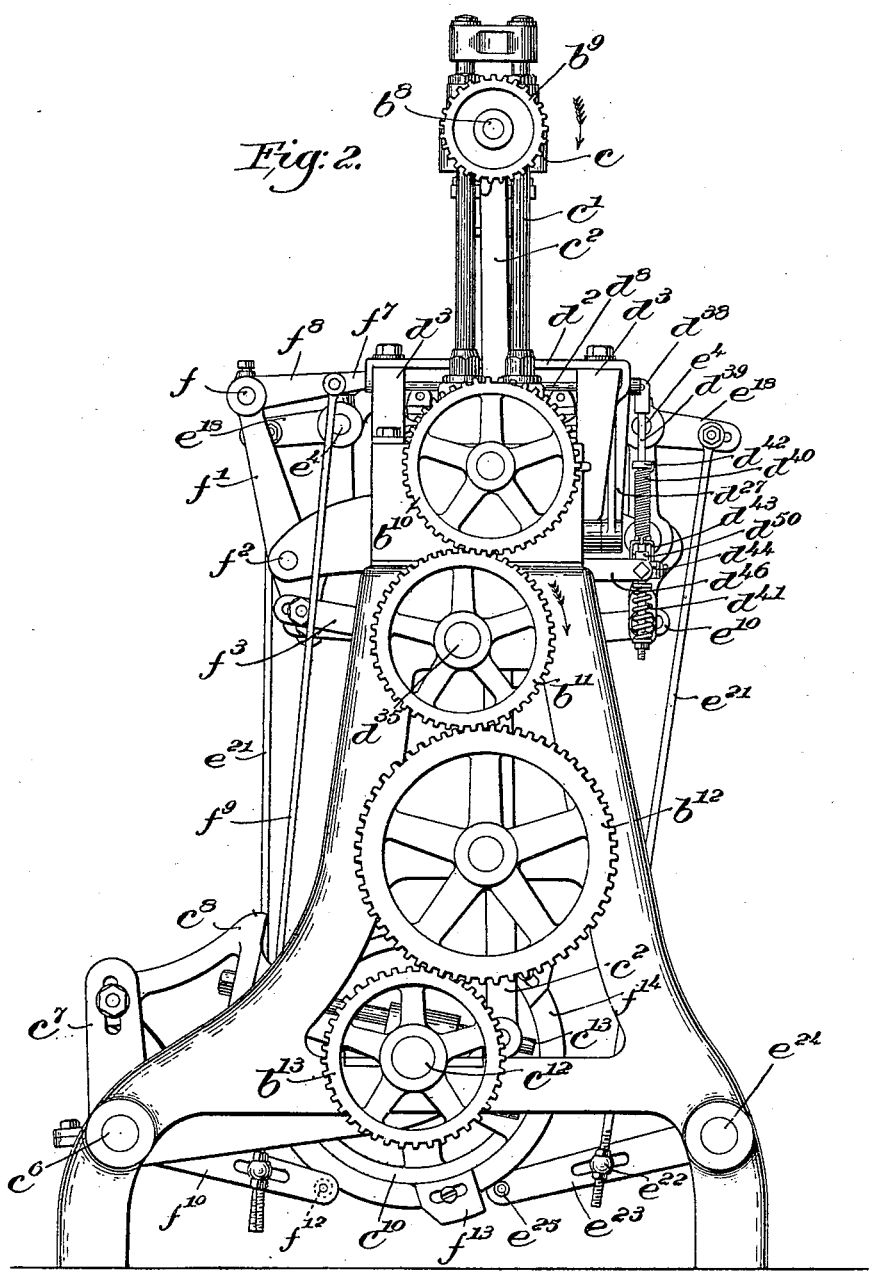

No. 667,207. Patented Feb. 5, 1901.
A. D. FENWICK.
FOLDING MACHINE FOR COLLARS, &c.
(Application filed Dec. 20, 1898.)
(No Model.) 10 Sheets—Sheet 3.
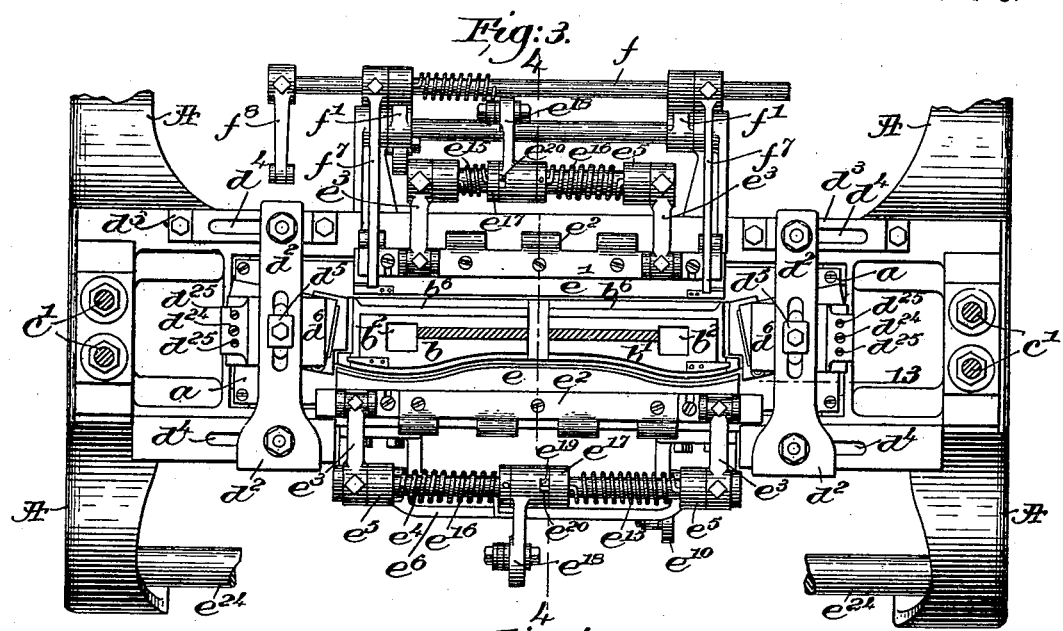
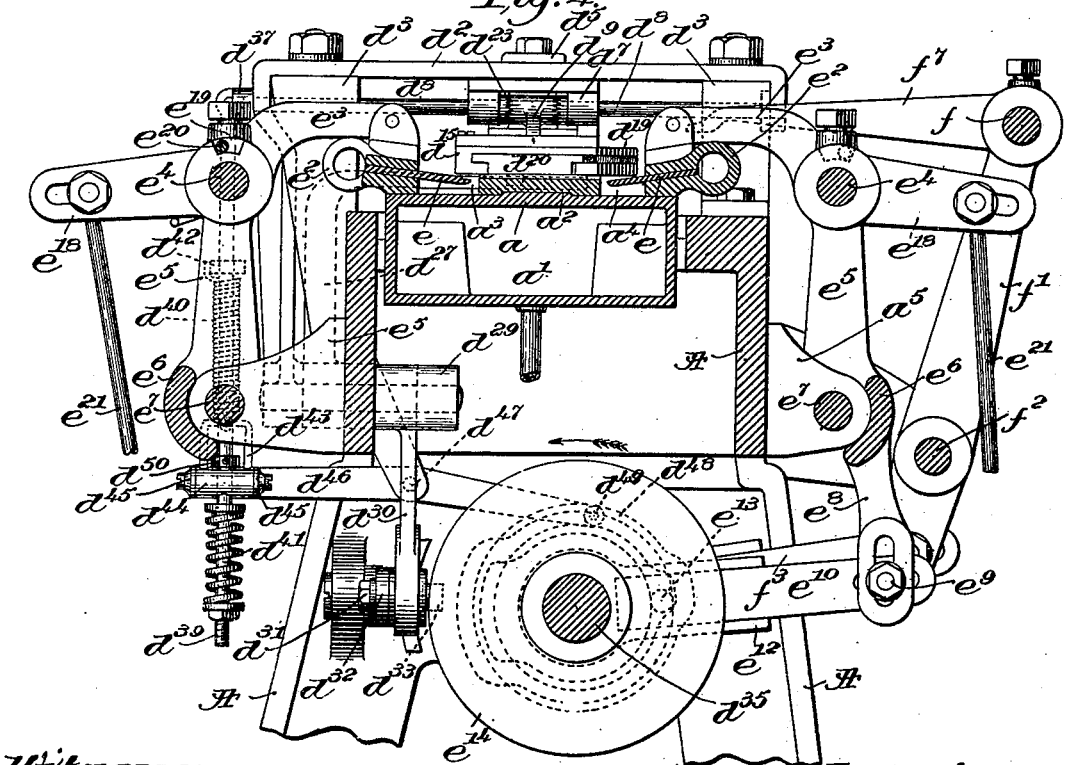
Witnesses,
Edward F. Allen.
Fred S. Greenleaf.
Inventor,
Albert D. Fenwick,
by Crosby & Gregory,
attys.

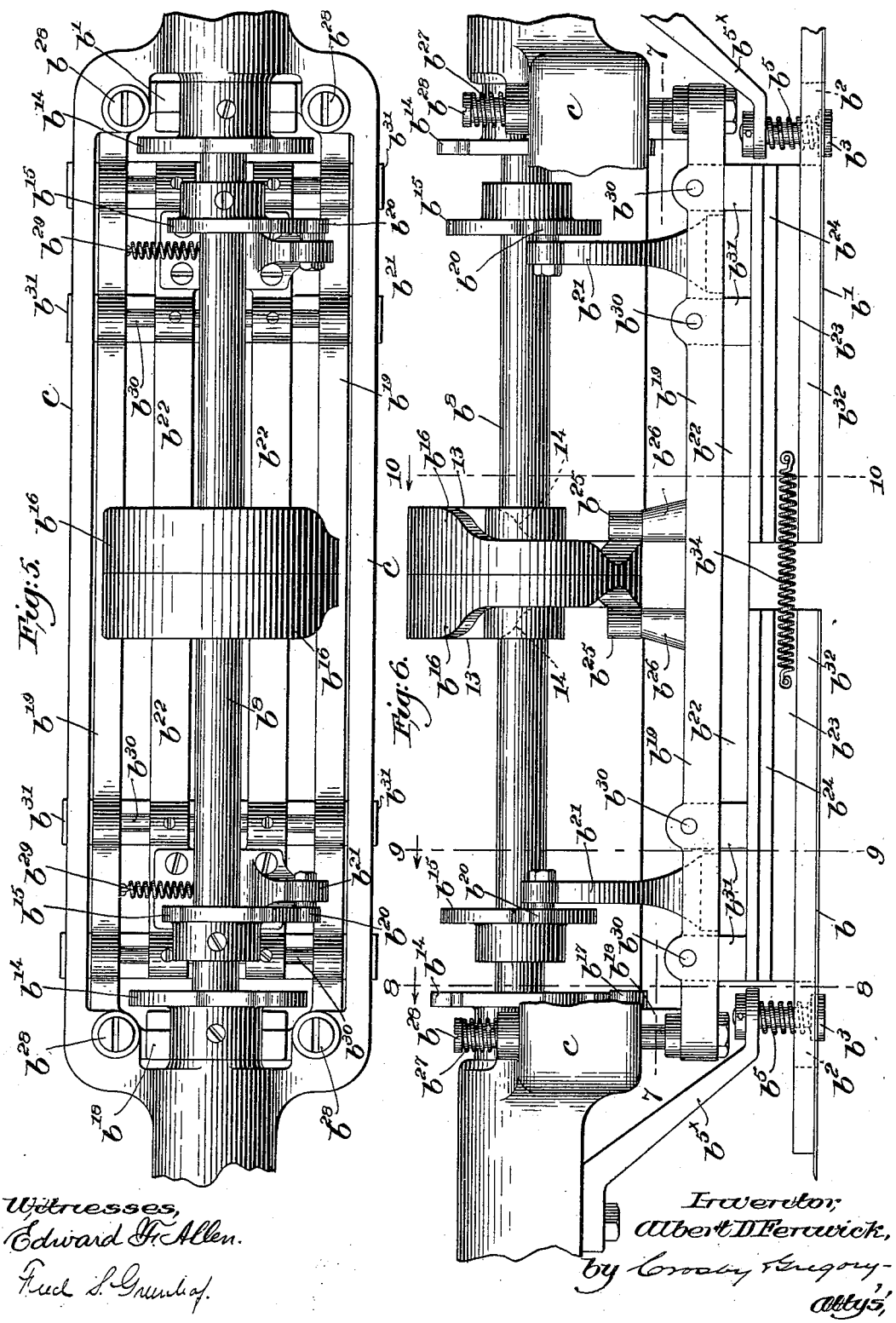

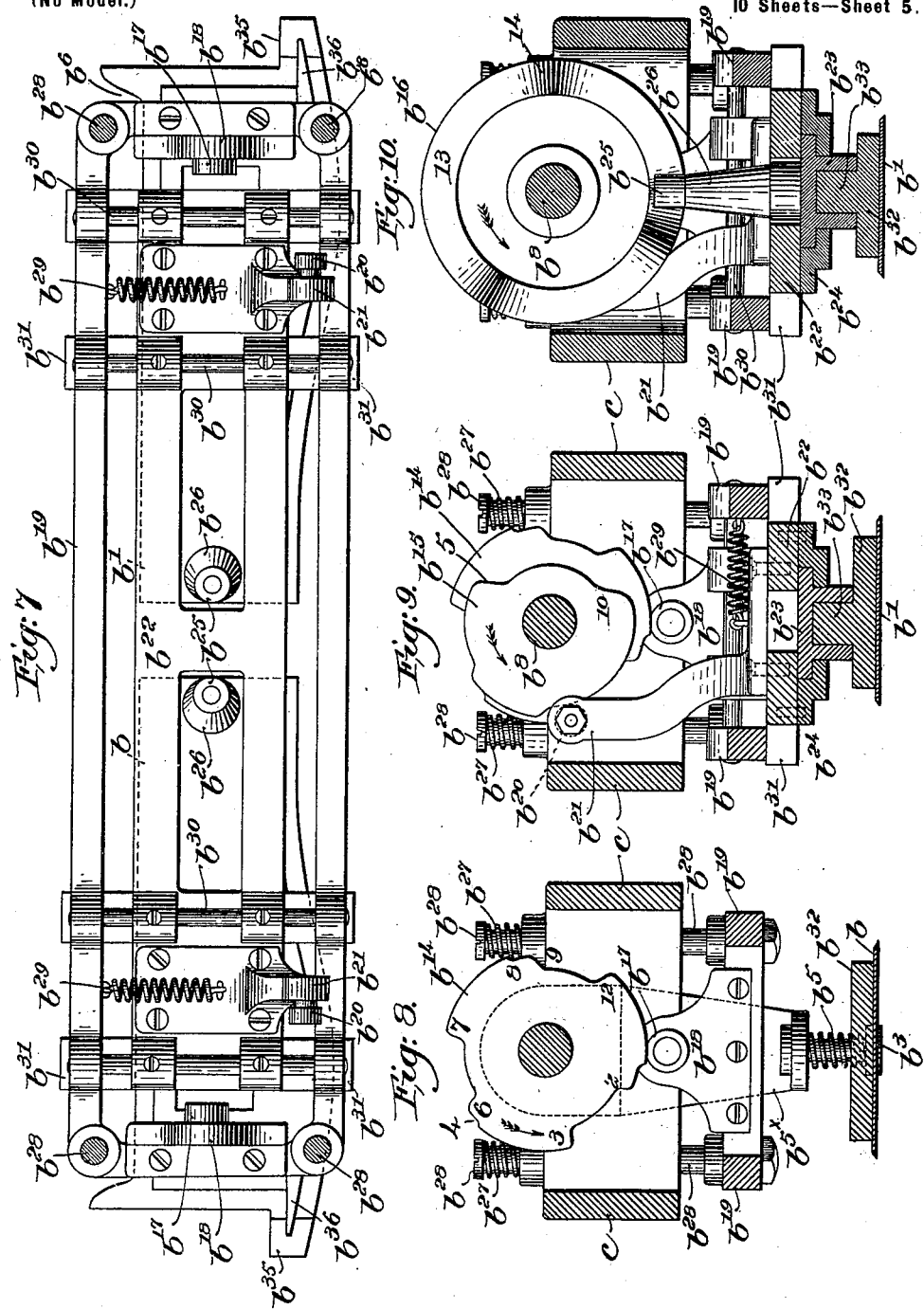

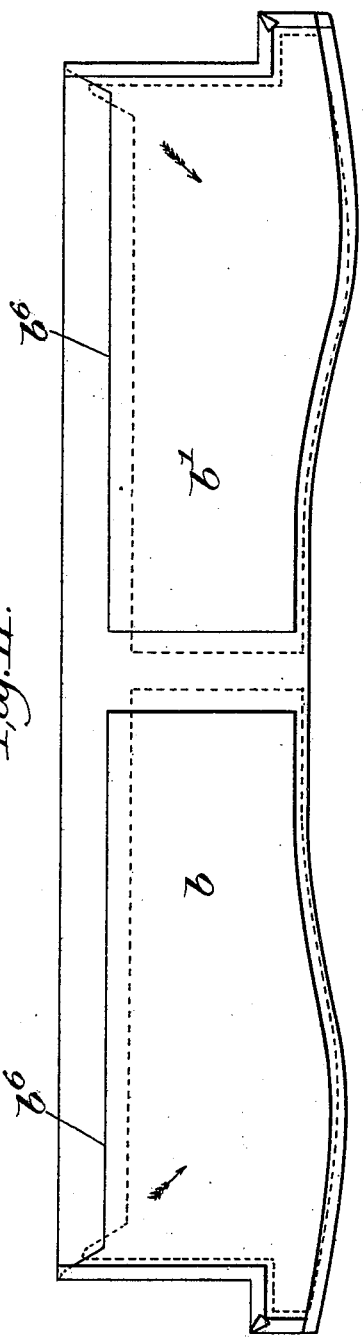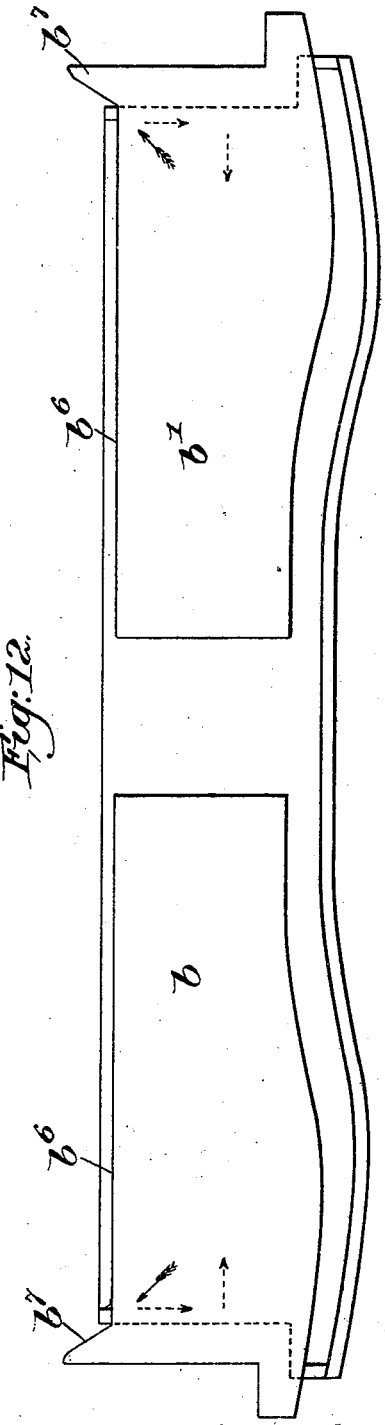

No. 667,207. Patented Feb. 5, 1901.
A. D. FENWICK.
FOLDING MACHINE FOR COLLARS, &c.
(Application filed Dec. 20, 1898.)
(No Model.) 10 Sheets—Sheet 7.
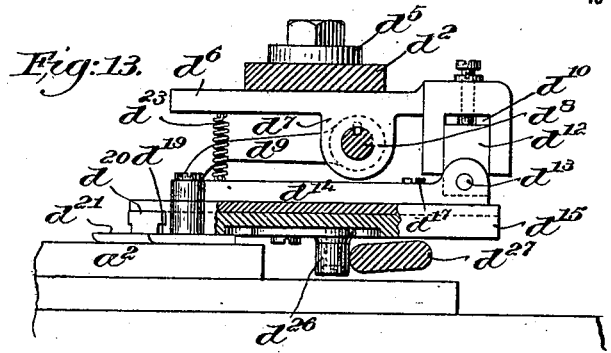
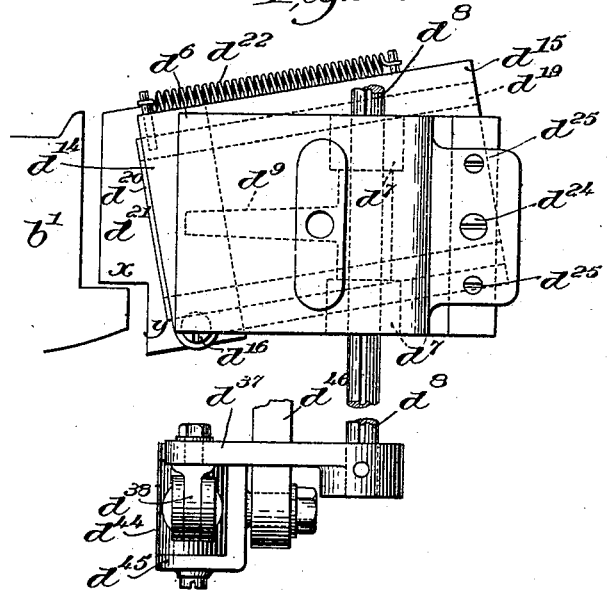
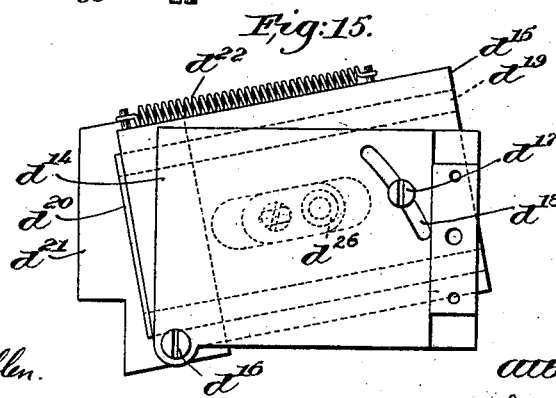

No. 667,207. Patented Feb. 5, 1901.
A. D. FENWICK.
FOLDING MACHINE FOR COLLARS, &c.
(Application filed Dec. 20, 1898.)
(No Model.) 10 Sheets—Sheet 8.
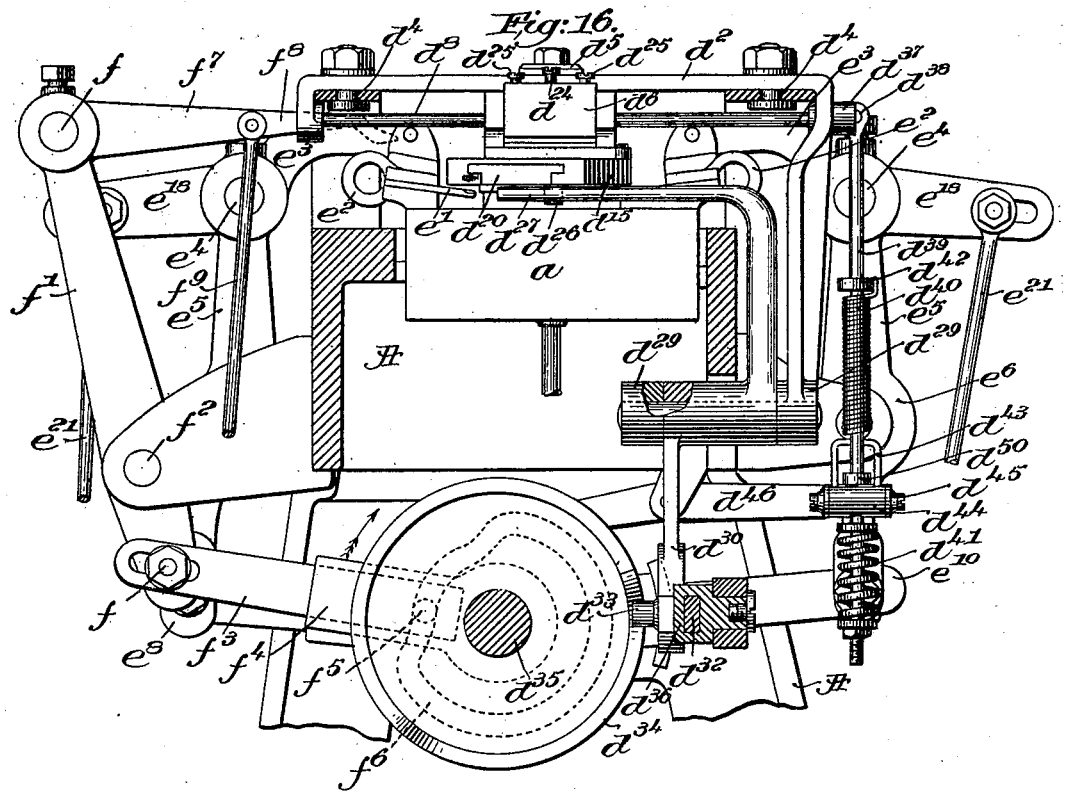
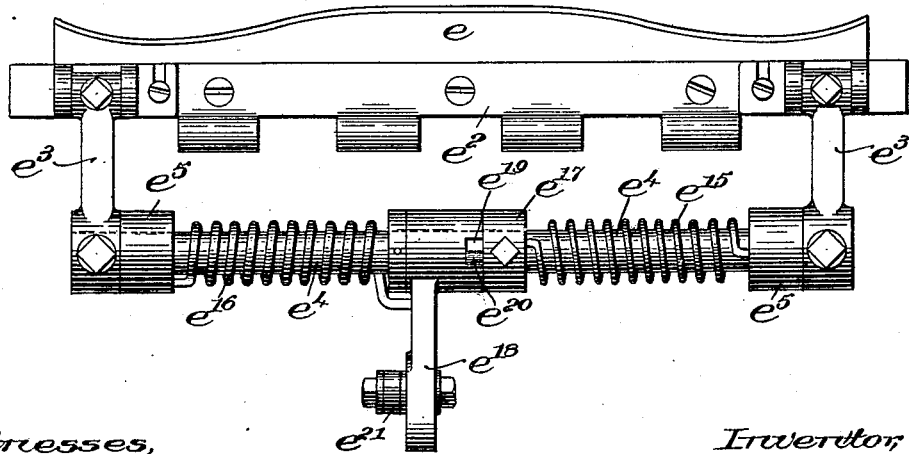
Witnesses,
Edward H. Allen.
Fred S. Grunhof.
Inventor,
Albert D. Fenwick,
by Crosby Gregory
attys.

No. 667,207. Patented Feb. 5, 1901.
A. D. FENWICK.
FOLDING MACHINE FOR COLLARS, &c.
(Application filed Dec. 20, 1898.)
(No Model.) 10 Sheets—Sheet 9.
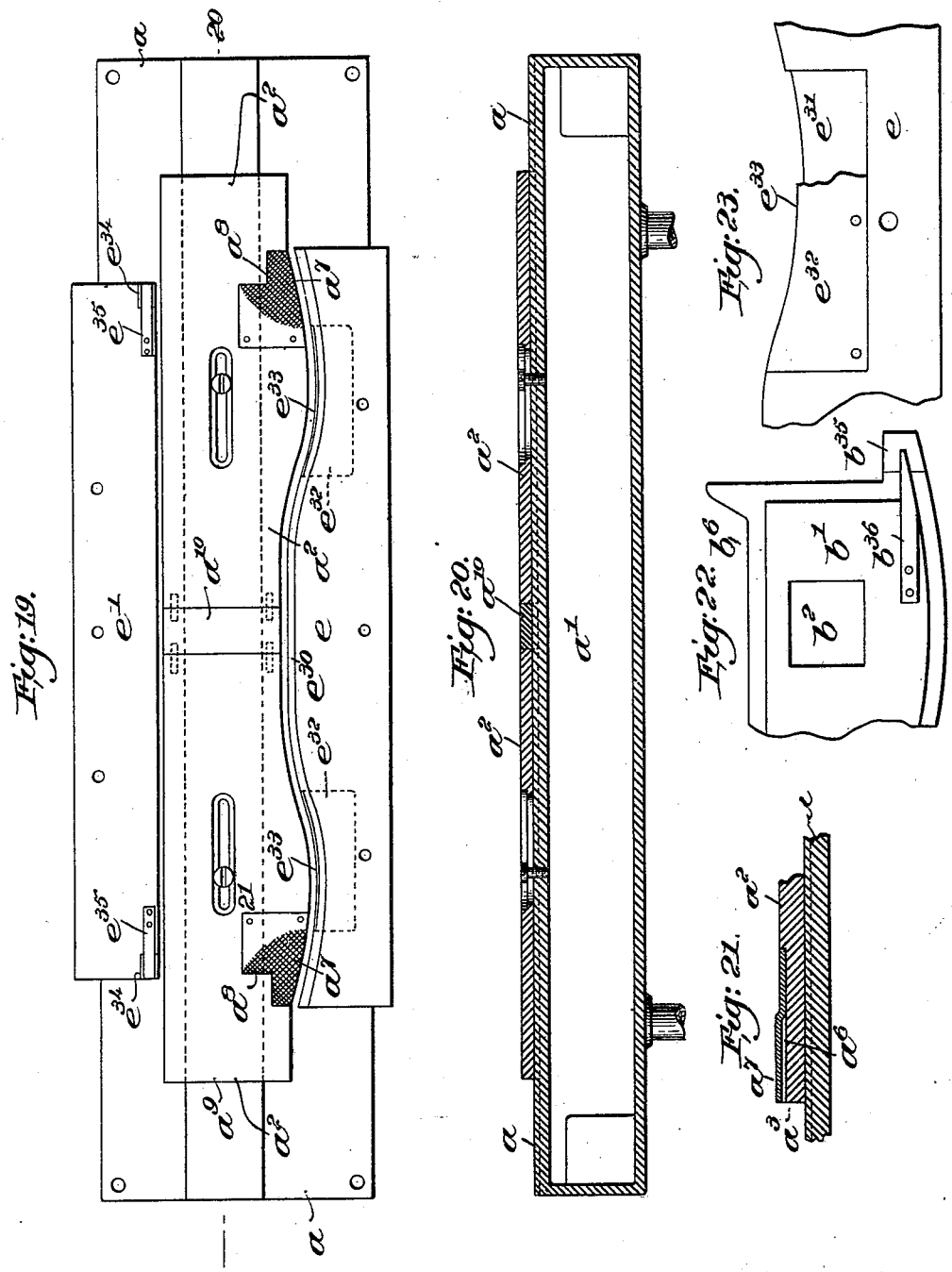

No. 667,207. Patented Feb. 5, 1901.
A. D. FENWICK.
FOLDING MACHINE FOR COLLARS, &c.
(Application filed Dec. 20, 1898.)
(No Model.) 10 Sheets—Sheet 10.

UNITED STATES PATENT OFFICE.

ALBERT D. FENWICK, OF BOSTON, MASSACHUSETTS, ASSIGNOR, BY MESNE ASSIGNMENTS, TO THE REECE FOLDING MACHINE COMPANY, OF SAME PLACE AND PORTLAND, MAINE.

FOLDING-MACHINE FOR COLLARS, &c.

SPECIFICATION forming part of Letters Patent No. 667,207, dated February 5, 1901.

Application filed December 20, 1898. Serial No. 699,817. (No model.)

*To all whom it may concern:*

Be it known that I, ALBERT D. FENWICK, of Boston, county of Suffolk, State of Massachusetts, have invented an Improvement in Machines for Folding Collars, Cuffs, and the Like, of which the following description, in connection with the accompanying drawings, is a specification, like characters on the drawings representing like parts.

My invention is a machine for folding collars, cuffs, and the like. In my United States Patent No. 606,528 I have shown and described a machine for this purpose, and the present invention is another machine for accomplishing the same general objects, being, however, adapted to fold the collar-blanks, for example, much more quickly and with fewer movements than the aforesaid machine, the present machine being, moreover, simpler and more compact in construction. In the present machine all the operating-shafts are driven with a continuous forward rotation and the forming-die accomplishes its required functions by three main movements, being of special shape for this purpose. The end folding-blades make the end folds by a special movement, and in the preferred form of the machine these blades are spring-actuated in their return movements, special provision being also given for accommodating the different blades to varying thicknesses of cloth, and the machine also has special holders and retaining-fingers for preventing the blanks from being accidentally shifted either during the movement of the former or die or during the movement of the folding-blades.

Various other novel features and the details of construction and mode of operation of my improved machine will be pointed out in the course of the following description, reference being had to the accompanying drawings illustrative of a preferred embodiment of my invention, and the latter will be thereafter more particularly defined in the claims.

Figure 24:
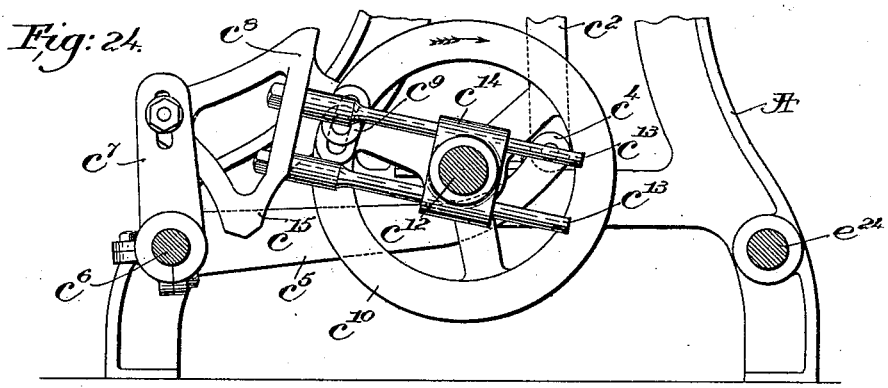
Figure 25:
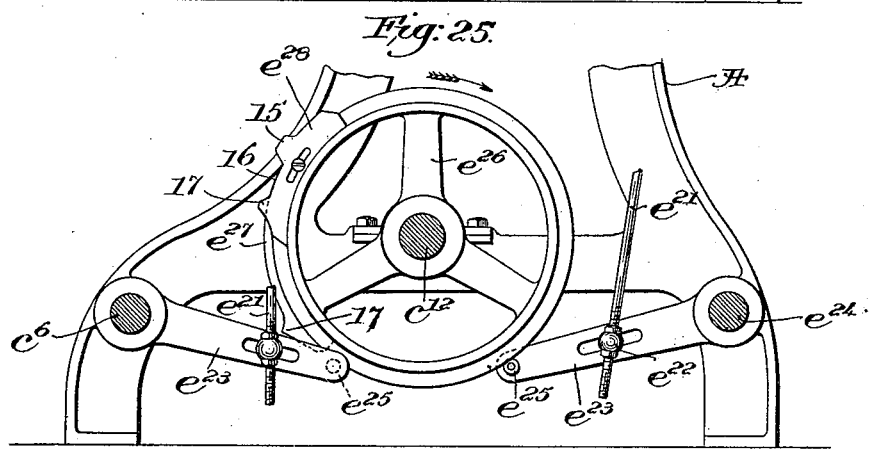
Figure 26:
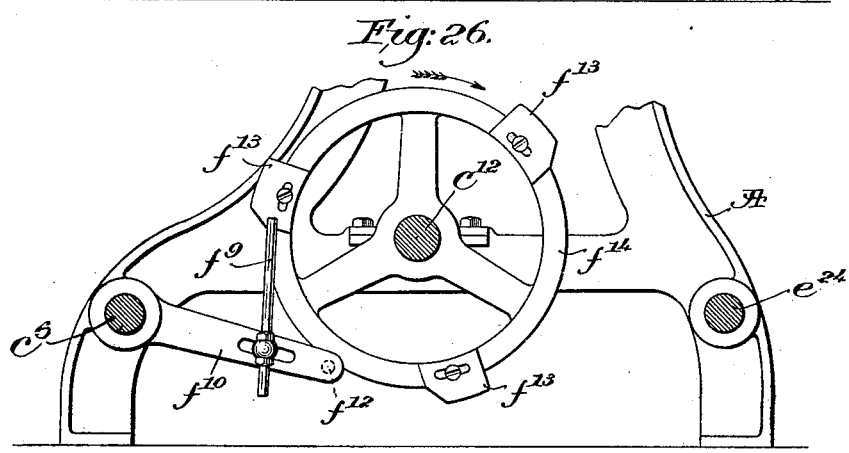

In the drawings, Figure 1 shows in front elevation one form of my invention, parts being broken away for clearness of illustration. Fig. 2 is an end elevation viewing Fig. 1 from the left. Fig. 3 is a top plan view, parts being broken away, the cross-head being omitted, but the die indicated in position. Fig. 4 is a transverse sectional view taken on the dotted line 4 4, Figs. 1 and 3. Figs. 5 and 6 are enlarged views, respectively in plan and front elevation, showing the cross-head. Fig. 7 is a horizontal sectional view taken on the line 7 7, Fig. 6, showing the former or die in top plan view. Figs. 8, 9, and 10 are vertical cross-sectional views taken, respectively, on the lines 8 8 9 9 10 10, Fig. 6. Figs. 11 and 12 are plan views illustrating the various positions assumed by the forming-die as a collar-blank is being folded. Fig. 13 is an enlarged vertical sectional view taken on the line 13 13, Fig. 3, parts being broken out. Fig. 14 is a similarly enlarged top plan view of the right-hand-end folding mechanism. Fig. 15 is a detail in top plan of the folding-blade, guide, and carrier shown in Fig. 14. Fig. 16 is an enlarged vertical cross-section taken on the line 16 16, Fig. 1, looking in the direction of the arrow and showing one of the operating-cams, hanger, &c. Fig. 17 is an enlarged top plan view of the front folding mechanism. Fig. 18 is an enlarged detail showing the front folding-blade in vertical cross-section. Figs. 19 and 20 show the raised bed-plate and side folding-blades, respectively, in top plan and in longitudinal section. Fig. 21 is a sectional detail of the bed-plate. Fig 22 is an enlarged plan view of a portion of the forming-die. Fig. 23 is a fragmentary bottom plan view of the front edge-folding blade. Figs. 24, 25, and 26 are vertical cross-sections taken on the lines 24 25 26, Fig. 1, and showing, respectively, the cam devices for lifting the cross-head, regulating the pressure of the front and rear folding-blades, and operating the pinching-fingers.

The various parts of my machine are mounted in a suitable frame A, provided with a bed $a$, heating-chamber $a'$, and other features not necessary to enumerate and which are preferably substantially as shown in my patent mentioned.

The machine is herein shown as arranged for folding only one blank at a time, (using the word "blank" to include the number of plies required to be folded,) and various minor details thereof are omitted in order that my invention may be more readily apprehended in its essential features.

The bed $a$ has a bed-plate or raised pad $a^2$ secured centrally thereof and having the shape of the blank to be folded, thereby providing the bed at its opposite sides with depressions $a^3$ $a^4$ for a purpose to be explained, and on this bed-plate the blanks which are to be folded to make the collar, cuff, or similar article are placed by suitable means, it may be by hand, to be engaged by a former or die, herein shown as made in two parts $b$ $b'$, carried by a cross-head $c$ and folded by opposite end folding-blades $d$ $d'$ and side or edge folding-blades $e$ $e'$. The cross-head $c$ is mounted at its ends to reciprocate on guides shown as rods $c'$, being raised and lowered, in substantially the same way as shown in my aforesaid patent, by lifting-bars $c^2$, pivoted to the cross-head at $c^3$ and at their lower ends at $c^4$, Fig. 24, to an arm $c^5$ of a bell-crank journaled at $c^6$ and whose other arm $c^7$ carries a cam-block $c^8$, which is engaged at proper intervals by a roll $c^9$ of a wheel $c^{10}$, mounted on the driving-shaft $c^{12}$. The cam-block $c^8$ is held in required radial position relatively to the shaft $c^{12}$ by means of guide-pins $c^{13}$, operating through a slide-block $c^{14}$, loosely mounted on the shaft $c^{12}$ next to the cam-wheel $c^{10}$, so that as the latter rotates in the direction of the arrow, Fig. 24, its roll $c^9$ engages the lower end of the cam-block at $c^{15}$, and thereby moves the latter backward, raising the arm $c^5$ of the bell-crank, and thereby elevates the cross-head and former.

The former is shown as cut out adjacent its opposite ends at $b^2$ in order that the holding devices $b^3$ may bear firmly on the blank being folded and retain the latter immovably in place, notwithstanding the various shifting movements of the former thereover.

I have herein shown two holders $b^3$, one for each end of the blank, these holders being simply headed plungers, (see Figs. 6 and 8,) normally held downward by springs $b^5$, bearing between the head of the holder and a stationary bracket $b^{5\times}$, extending from the cross-head and in which the holder is loosely mounted.

The former or forming-die conforms in general shape to the shape of the collar or article being folded, excepting that at its rear edge the die is cut away, as shown at $b^6$, Figs. 11 and 12, thereby leaving a projection $b^7$ at each rear corner of the die.

The positions assumed by the former are shown in Figs. 11 and 12, Fig. 11 showing in full lines the initial position occupied by the former before the blank is folded, this figure also showing the two end folds as made. Said folds having been formed the two parts of the die are quickly moved diagonally forward and inward, so as to clear the end folds, being then raised above said folds, and are then quickly restored to their previous position and dropped on the blank, resting on the end folds just formed, and then the front edge fold is made, whereupon the die is moved rearwardly and outwardly into the full-line position, Fig. 12, so that the cut-away portion thereof is in proper position to receive the rear edge fold, which being formed the die is restored to its original position ready for forming the next collar-blank. It will thus be seen that the die occupies but three positions in forming a collar, this effecting a considerable saving of time and power.

The movements of the die, as just explained, are effected by the mechanism shown in Figs. 5 to 10, where it will be seen that I have journaled a shaft $b^8$ in the cross-head $c$, this shaft carrying at one end a gear-wheel $b^9$, which is engaged when the cross-head is down by a mutilated gear $b^{10}$, driven by an intermediate gear $b^{11}$ and idler $b^{12}$ from a gear $b^{13}$ on the driving-shaft $c^{12}$, Fig. 2. The shaft $b^8$ has fixed thereon opposite cams $b^{14}$ $b^{15}$ and an intermediate double-faced cam $b^{16}$, the first of which is engaged by rolls $b^{17}$, carried by brackets $b^{18}$, fixed on the ends of a frame $b^{19}$, and the second of which is engaged by similar rolls $b^{20}$, carried by brackets $b^{21}$, fixed on bridge-pieces $b^{22}$, in turn supporting slides $b^{23}$, operating in ways $b^{24}$ on the under side of the bridge-pieces, said slides carrying the former or die, while the doubled-faced cam $b^{16}$ is engaged by rolls $b^{25}$ on the ends of posts or brackets $b^{26}$, fixed to the slides $b^{23}$ to reciprocate the die longitudinally. The rolls $b^{17}$ bear vertically beneath their cams $b^{14}$, so that the latter may cause the die to be raised and lowered, the frame $b^{19}$ being held for this purpose normally under tendency to rise by means of springs $b^{27}$, bearing between the cross-head and the heads of posts $b^{28}$, extending through the cross-head from the frame $b^{19}$. The rolls $b^{20}$ bear at one side of their cams $b^{15}$ in order that the latter may cause the die to be shifted back and forth horizontally, the cam positively moving the die forward and a spring $b^{29}$ moving it in an opposite direction, (or this arrangement may be reversed, if desired,) the bridges $b^{22}$ being suspended on slide-rods $b^{30}$, sliding in ways provided therefor in the frame $b^{19}$, so as to permit this back-and forth movement. The bridge-pieces have flanges $b^{31}$ projecting beneath the frame $b^{19}$ or side bars thereof to aid in giving steadiness of movement, and the die, shown as metal plates secured on backings or pads $b^{32}$, is adjustably mounted at $b^{33}$ in the bridge-pieces, these features of adjustment not, however, being shown in detail, as they are substantially the same as in my before-mentioned patent. Suitable means, as a spring $b^{34}$, maintains the slides $b^{23}$ under tendency to move toward each other and holds their rolls against the faces of the cam $b^{16}$.

Figs. 5 to 10 show the parts in the position in which the die is brought down upon the work preparatory to folding. Studying these figures and bearing in mind that the shaft $b^8$ causes the cams to rotate together, it will be evident that the cams $b^{15}$ $b^{16}$ and spring $b^{34}$ coöperate in producing diagonal movements of the die, the office of the cams $b^{14}$ being merely to press down and release the pressure of the die on the blanks. The cams rotate in the direction of the arrows, Figs. 8 to 10, and therefore the first movement thereof causes the die to collapse with a diagonally forward movement, the cam $b^{14}$ meanwhile permitting the die to lift slightly, so as merely to release itself from its direct pressing engagement with the cloth, but not so as to lift out of contact therewith, the die moving diagonally forward in a substantially horizontal plane until its edges are out from under the end folds, as shown in dotted lines, Fig. 11, and then by reason of the rolls $b^{17}$ coming to the point 2 of the cams $b^{14}$ the die is instantly lifted, and thereupon the cams $b^{15}$ $b^{16}$ immediately restore the die to its full-line position, Fig. 11, for the folding of the front edge of the blank thereover. This out-and-back movement occupies but an instant, and when accomplished the projecting parts 3 of the cams $b^{14}$ again depress the die with a gripping pressure on top of the blanks, and then the front fold is made. Thereupon the portions 4 of the cams $b^{14}$ slightly relieve the pressure of the die on the cloth, so as to permit the die to move out from under the fold just made without lifting or unfolding the fold, this backward movement being accomplished by the inclines 5 of the cams $b^{15}$ and rendered diagonal by the cam $b^{16}$ and spring $b^{34}$, the latter part of the movement thereof being accomplished with the die considerably lifted, because of the inclines 6 of the cams $b^{14}$. The die is then depressed again by the projections 7 of the cams $b^{14}$ and remains stationary while the back fold is being made, whereupon it is first slightly raised by the depressions 8 and then fully raised by the incline 9, while the inclines 10 of the cams $b^{15}$ meanwhile restore the die to its original position, where it is finally again pressed by the projections 12 of the cams $b^{14}$ with a final setting pressure on the now completely-folded blank.

I have not undertaken in this description to explain minutely all the movements of the several cams, inasmuch as they are clearly shown and will be readily understood by those skilled in the art.

It will be observed that the shoulders 3, 7, 9, and 12 of the cams $b^{14}$ are timed to act in giving the die its up and down movements when the idle or arc portions of the cams $b^{15}$ receive the roll $b^{20}$, and therefore give no forward or backward movement to the die, my object being to make the die move in each instance onto the blank with a straight up-and-down movement or in a path perpendicular to the receiving-bed.

When a die moves onto goods in an oblique downward movement and comes in contact with a fold, the tendency is to shove or roll the fold to a slight degree ahead of the die, and thereby produce an imperfect crease, whereas by the provision mentioned the die comes straight down on the goods and prevents any improper movement of the partially-made folds, while at the same time insuring that they will be creased neatly and perfectly. The shoulder or incline 9 does not depress the die, but raises it, and in the construction of apparatus herein shown it is essential that this movement of the die should be in a perpendicular path just the same as the downward movements, inasmuch as at this point of movement of the cams the die has just been retracted from the back fold and the front edge of the die is close to the inner edge of the front fold, there being scarcely any clearance between the opposite edges of the die and the free edges of the front and back folds, so that it is therefore essential that the die should move straight up, so as not to catch and disturb either of the long edge folds. It may be well to observe further that when the die is brought into its final position, ready to give the setting pressure on the fully-folded blank, the projections or shoulders 10 of the cams $b^{15}$ act to shift the die forward at a time when the straight portions 13 of the cams $b^{16}$ engage their rolls, so that the die moves straight forward, and just before it reaches its final position the depressions 14 of the cams $b^{16}$ act to permit the die to collapse into its final and original position.

Referring now to the end blades, and more particularly to Figs. 13 to 15 in connection with Figs. 3 and 4, it will be seen that I have mounted a supporting-plate $d^2$ above the frame of the machine on angle-plates $d^3$, Fig. 4, adjustable at $d^4$ for different lengths of blanks, and to each plate I bolt (adjustably for different styles of blanks) at $d^5$ a hanger $d^6$, having at its under side perforated ears $d^7$, in which is journaled the shaft $d^8$ of a pressure-arm $d^9$, and adjacent said ear the hanger carries in a guideway $d^{10}$ a block $d^{12}$, to which is pivoted at $d^{13}$ a blade-carrier $d^{14}$, which supports a guide $d^{15}$, preferably adjustably mounted to turn on a pin $d^{16}$ and held by a set-screw $d^{17}$ working in a slot $d^{18}$, to accommodate the device to different shapes and materials of articles being folded. The guide $d^{15}$ is T-slotted on its under side at $d^{19}$, as shown clearly in Figs. 4 and 13, and in this slot or slideway is mounted a properly-shaped rib $d^{20}$, provided at its forward end with a thin (preferably beveled) folding-blade $d^{21}$. A spring $d^{22}$ is secured at its forward end to the rib $d^{20}$ and at its rear end to the guide $d^{15}$, normally tending to retract the folding-blade, while a spring $d^{23}$ tends to hold the carrier, guide, and blade in raised position.

For certain work it is desirable that the pitch or inclination of the folding-blades should be greater or less than at other times, and accordingly the block $d^{12}$, which carries the blade and parts, is adjustable, being held upward by a draft-screw $d^{24}$, and adjusted to the inclination and position desired by set-screws $d^{25}$. At its under side the folding-blade is provided with a roll $d^{26}$, preferably adjustable thereon, as shown, to suit different adjustments forward and back of the folding-blade. This roll is engaged by an arm $d^{27}$, (see Figs. 4, 13, 14, and 16,) which engages the roll at its back side and moves the blade forward for folding, the blade being retracted by the spring $d^{22}$, a second spring $d^{28}$ being also preferably provided for pulling back the arm $d^{27}$. The arm $d^{27}$ is intermediately journaled in a U-shaped hanger $d^{29}$, formed by the bent lower end of the plate $d^2$, and the lower end $d^{30}$ of said arm or lever is adjustably secured at $d^{31}$ to a bar $d^{32}$, provided intermediately with a stud $d^{33}$, bearing against a face-cam $d^{34}$ on a shaft $d^{35}$, driven by the gear $b^{11}$, before mentioned, said bar $d^{32}$ being reciprocable in an oscillating slideway $d^{36}$ on the frame of the machine. (See Figs. 1 and 16.) Thus as the stud $d^{33}$ rides up a projection of the cam $d^{34}$ the end blade will be moved forward for folding, and the blade having completed the folding movement the stud drops over the cam projection, permitting the springs $d^{28}$ $d^{22}$ instantly to retract the folding-blade, so that the former or die may be moved for another fold without a moment's delay.

In order that the folding-blades may readily accommodate themselves to varying thicknesses of blanks, I have provided each of the blades with a yielding pressure mechanism so arranged as to give a differential pressure, light at the beginning of the movement and heavy at the end, or when the fold has been almost or quite made. This mechanism for the end blades is seen best in Figs. 1 and 4 and includes the shaft $d^8$ and arm $d^9$ thereon, the former having at its outer end an arm or lever $d^{37}$, connected by a universal joint $d^{38}$ (to accommodate it to the adjusted positions of the supporting-plate $d^2$) to a rod $d^{39}$, carrying a light spring $d^{40}$ and a heavy spring $d^{41}$, the light spring being secured at its upper end to a fixed nut or shoulder $d^{42}$ and at its lower end to a stirrup $d^{43}$, projecting from a perforated hub $d^{44}$, which slides on the rod $d^{39}$, and is carried by a U-shaped clip $d^{45}$ at the end of a lever $d^{46}$, pivoted at $d^{47}$ to a fixed bracket and operated by a path-cam $d^{48}$, in which travels a roll $d^{49}$ of said lever. A collar $d^{50}$, preferably adjustable on the rod $d^{39}$, is in position above the hub $d^{44}$ to be engaged by the latter when it is required to entirely lift the pressure-arm $d^9$ from the folding-blade. In action this pressure mechanism operates against the spring $d^{23}$ when the blade begins its folding movement, simply to hold the forward end of the blade down sufficiently to fold over the material without any danger of disturbing or distorting the same, the light spring $d^{40}$ affording enough pressure, while at the same time yielding readily to permit the blade to rise to a greater or less degree, according to the particular thickness of material being folded, no matter how many thicknesses or what unevenness may be met with. When, however, the cloth has been bent over and this much of the infold has been accomplished with certainty, the lever $d^{46}$ is lowered at its outer end, thereby bringing to bear the additional pressure of the heavy spring $d^{41}$ on the pressure-arm $d^9$, so as to firmly and quickly press and crease the fold then being completed. Also this spring construction permits the arm $d^9$ to be released instantaneously the moment the fold is made and when it is desired to move back the folding-blade, this being of advantage in order that no time may be lost and so that, if required, the former or die may even be moved out from the fold before the folding-blade has had a chance to move back, the latter under such circumstances offering no resistance, provided the pressure of the arm $d^9$ is relieved, inasmuch as the spring $d^{23}$ will instantly raise the folding-blade sufficiently to prevent interference with any movement of the die.

It will be understood that each of the end folding-blades $d$ $d'$ has all the construction and operating parts above described. The front and rear folding-blades and their accompanying mechanism likewise are mainly similar to each other, and therefore a description of one will suffice.

Referring more particularly to Figs. 1 to 4 and 17 to 20, it will be seen that the front and rear folding-blades are carried in U-shaped clamps $e^2$, pivoted between rocker-arms $e^3$, fixed on the opposite ends of a shaft $e^4$, loosely journaled in the upper ends $e^5$ of a yoke $e^6$, pivoted at $e^7$ in ears $a^5$ of the frame, said yoke having a depending arm $e^8$, shown as adjustably secured at $e^9$ to a throw-arm $e^{10}$, sliding in a guide-hanger $e^{12}$, loosely mounted on the shaft $d^{35}$ and having a stud $e^{13}$ traveling in a path-cam $e^{14}$.

The above mechanism operates, as will readily be understood, simply to throw the folding-blades out and in, according to the movements of the cams $e^{14}$. One feature of my invention, however, resides, as before intimated, in lowering the front edges of the folding-blades into recesses $a^3$ $a^4$, so that said blades will be out of the path of horizontal movement of the former or shaping die, it being of great advantage to have said die capable of movement straight out and back without the waste of power and time required to move it in diagonally upward and downward lines, as in my patent mentioned. To accomplish this up-and-down movement of the side blades and coöperating with the mechanism just described, I provide a lifting and pressure regulating mechanism of special construction. (Shown best in Figs. 3, 4, 17, and 20.)

The shaft $e^4$ carries a light spring $e^{15}$ and a heavy spring $e^{16}$, secured, respectively, in the ends $e^5$ of the yoke $e^6$ or to any other relatively stationary part as may be convenient, the opposite ends of said springs being respectively fast in a collar $e^{17}$, adjustably fixed on the shaft $e^4$, and an arm $e^{18}$ loose on said shaft, said collar and arm having limited relative movement by means of a slot or recess $e^{19}$ in one and a pin or spur $e^{20}$ in the other, as clearly shown in Fig. 17. At its free end the arm $e^{18}$ is pivoted to a rod $e^{21}$, preferably adjustably mounted at $e^{22}$ on a lever $e^{23}$, journaled at $e^{24}$ to the frame of the machine and carrying at its free end a stud or roll $e^{25}$. The power-shaft $c^{12}$ carries a cam-wheel $e^{26}$, provided with a cam surface or block $e^{27}$ to engage the stud $e^{25}$ of the front folding-blade and a cam surface or block $e^{28}$ to engage the stud $e^{25}$ of the rear folding-blade, the cam-surface $e^{27}$ being considerably longer than the cam $e^{28}$, as the front folding-blade is preferably maintained in pinching or creasing engagement with the front fold until the rear fold has been made.

The mechanism last described coöperates with the mechanism $e^3$ to $e^{14}$ to produce the required compound movements of the front and rear folding-blades, so that as the cam $e^{14}$ is about to swing its folding-blade inwardly the cam $e^{28}$, (let us suppose,) moving in the direction of the arrow, depresses its roll $e^{25}$ and lifts the front edge of the folding-blade just enough to clear the former or die resting on the blank and permit the blade to fold the cloth. It accomplishes this by pulling down on the rod $e^{21}$ until the inner edge of the notch $e^{19}$ engages the spur $e^{20}$ and through the fixed collar $e^{17}$ rocks the shaft $e^4$ just enough to accomplish the purpose. The front lower edges of these folding-blades are beveled at $e^{29}$, as shown, (see Fig. 18,) so that they ride upon the cloth readily, and because of the fact that the folding-blades are swung in the arc of a circle from their pivots in the bracket $a^5$ as a center it follows that as soon as they have moved slightly forward for folding they are raised sufficiently to turn the spur $e^{20}$ out of engagement with the inner side of the recess $e^{19}$, thereby bringing the pressure of the light spring $e^{15}$ to bear, so that a neat and accurate fold is insured. As soon as the fold is made it is necessary, however, to get the former or die out from beneath the fold and folding-blade, as previously explained, and accordingly the projection 15 of the cam-surface $e^{28}$ depresses the lever $e^{23}$ sufficiently to engage the inner shoulder of the recess $e^{19}$ with the spur $e^{20}$, so as entirely to raise the blade from the work, this operation being momentary only, however, for the instant that the former is out from under the folding-blade the roll $e^{25}$ of the arm $e^{23}$ drops off from the projection 15 of the cam and into the lower surface 16 thereof, so as instantly to bring to bear on the blade the tension of both the light spring $e^{15}$ and the heavy spring $e^{16}$, thereby firmly and permanently creasing the folds, this pressure being retained until the blades are to be removed. The projections 17 of the two cams serve to momentarily depress the levers $e^{23}$ at the proper instants when the respective cams $e^{14}$ pull inwardly on the arms $e^8$ and retract the folding-blades from their position over the blank, and then the cams $e^{27}$ $e^{28}$ pass out of engagement with their rolls and permit the folding-blades to drop into their cavities $a^3$ $a^4$, as before.

It is necessary, of course, that when the die is moved it should have a free path of movement, and in my patent before mentioned I accomplish this by moving the die upward each time; but said upward movement tends slightly to unfold the folds previously made.

In the present machine I have devised a set of movements in which there is no tendency whatever to unfold the previously-laid folds; but the die moves straight out from under the folds, this movement being made possible in one instance by dropping the side folding-blades out of the way and in the other instance by moving the end blades back sufficiently to permit the necessary horizontal movements of those portions of the die. A further very important advantage of this movement is that it enables me to place the blanks flat on the bed-plate with the certainty that the side folding-blades will always be under the edges in proper position to lift said edges and lay them over to make an accurate fold. It is always necessary for the side blades to be beneath the goods when the die comes down. The end blades after making their folds move back a considerable distance, due to the thin upper portion of the cam $d^{34}$, as shown in Fig. 1, and then the die having moved out and back the end blades are moved inward just as the cross-head goes up and remain in position to make the end folds the instant the cross-head comes down.

The blanks may be placed in the machine by any feeding mechanism or by hand, and preferably one of the blades will have a slight alining ledge or gage, as indicated at $e^{30}$.

One most serious difficulty experienced in folding cloth blanks is their extreme liability to shift even under the pressure of a firm die. Accordingly I have provided in addition to the pressure devices just described and in addition to the holders $b^3$ pinching devices, preferably in the form of fingers, as shown, these fingers coming down on top of the fabric and preferably also on top of the die after each movement of the die and holding the fabric tightly and immovably right at the corners where the fabric is most liable to become disarranged or distorted. This pinching mechanism is shown best in Figs. 2 to 4 and 26 and comprises a rock-shaft $f$, loosely supported in the upper ends of arms $f'$, pivoted at $f^2$ to brackets of the frame of the machine and swung out and in by a throw-arm $f^3$, pivoted to the lower end of an arm $f'$ and carried by a hanger $f^4$, the same as the hanger $e^{12}$, the throw-arm $f^3$ having a roll $f^5$, engaging a path-cam $f^6$, the same as described for the roll $e^{13}$ and its path-cam. The rock-shaft carries pinching-fingers $f^7$, herein shown as two in number, which come down on the former and pinch the fabric between it and the bed, and has fixed at one end a crank $f^8$, pivotally connected at its free end by a rod $f^9$ to a lever $f^{10}$, mounted loosely on the shaft $c^6$ and having a roll $f^{12}$ in the path of pinching-cams $f^{13}$, carried by a wheel $f^{14}$, fast on the driving-shaft $c^{12}$, Fig. 26. The pinching devices are preferably placed near the folds, and in this connection I wish to state that the holding devices, if preferred, may be carried by the main frame of the machine instead of the cross-head and operated by cams the same as the pinching devices, and said holding devices may also be located differently, being brought down on top of a fold, as at a corner, if desired, the die being correspondingly cut away at its edge or interiorly, according to the position of the holding device.

In folding a curve, such as the front edge of the blank shown in the drawings or such as a round-collar tab end or a round-cornered cuff, and in various other places where the fabric piles upon itself in the form of a plait or a superimposed fold, the material will necessarily maintain an unevenness of thicknesses of fold, with the result that the folding-blade gets a firmer grip on the material at these thicker portions and causes the goods to stretch toward that point, this fault being increased by the further fact that as the blade is held up by the thicker plaits or folds the adjacent portions of the cloth are not held down by the blade against possibility of thus shifting out of their proper position as the blade moves forward in folding. I cure this difficulty in my present machine by providing a depression in the folding-blade at such places; also, preferably placing a spring in this depression, as shown in Figs. 19 and 23, where it will be seen that the blade $e$ is provided at its inwardly-curved portions with a depression $e^{31}$.

For heavy material, such as percale, a simple slight depression is found to be ample to prevent the fabric at its edge from being distorted along a bias-line and stretching the edge of the fabric adjacent the curved portions of the folds; but for lighter and finer material, such as fine cambrics and linens, I prefer to add a thin highly-tempered spring $e^{32}$, fitting within the depression $e^{31}$ and extending slightly thereover at its forward edge $e^{33}$, where the spring is bent upwardly to ride over the goods easily. I do not mean to restrict this part of my invention to use only in making the particular fold where I have herein illustrated it, but intend to cover it as applied to any such place as described. This part of my invention is of more importance than may appear at first glance, inasmuch as it removes a practical difficulty which otherwise proves fatal to the success of this class of machine. A further difficulty of much the same nature, which in practice has proved a serious obstacle to the proper working of this kind of machine, is that in laying over the folds at a corner of the blanks a double thickness of folds is heaped up, inasmuch as the end fold, for instance, is laid over on top of the edge fold, and accordingly when the forming die and blades, as the case may be, come down on the fabric to crease it they crease it perfectly at the corners, but are held up by the extra thicknesses of the corners, so that their intermediate portions are prevented from pressing the intermediate material to the degree necessary for perfect folding, and also being held up at their ends they cannot prevent the material beneath them from getting accidentally shifted by other adjacent movements which may be taking place.

I meet the above difficulty by providing movable corners where required, according to the style and purpose of the machine, said corners being herein shown as made movable in the die and the rear folding-blades, although it will be understood that in case the order of folding movements of my machine were varied by timing the cams differently the front folding-blade, instead of the rear folding-blade, might have its corners made movable, or the die might be depended upon alone or the folding-blades alone, all within the scope of my invention. This feature is shown in detail in Figs. 19 and 22, where it will be seen that the tang end $b^{35}$ of the die or former is severed from the rest of the die and yieldingly supported thereon by a spring $b^{36}$. So in Fig. 19 the corners $e^{34}$ of the rear folding-blade are detached therefrom and supported by springs $e^{35}$. Thus when the rear folding-blade moves over to make the rear fold its middle portion is permitted to descend with even pressure throughout the length of the back edge of the blank, not being held up at its corners by the extra thickness thereat of the end folds, inasmuch as the corners $e^{34}$ ride up on said thicker ends or corner fold without raising the entire blade, and thereafter when the die comes down on the completely-folded blank (after having been withdrawn from beneath the back fold) the ends $b^{35}$ of the die act in the same manner as the ends $e^{34}$ and permit the rest of the die to press evenly on the even thicknesses of the folds.

Another difficulty experienced is that it is customary to cut away one of the lining-plies at the buttonholes, and this results in a less thickness of material, which, especially at the tab ends of the blank, causes a sufficient decrease of thickness at that point to permit the material to shift slightly in the folding operation, so that an inaccurate fold often results. Accordingly I provide a special tab-support in the die-plate, shown in detail in Figs. 19 and 21, where it will be seen that the die-plate is cut away at $a^6$ and provided with a yielding surface, shown as a stiff spring $a^7$, having a sharply-corrugated surface $a^8$, Fig. 19, said spring normally occupying a position slightly above the plane of the bed-plate, just enough to compensate for the thickness of material removed from the blank, the result being that when the die comes down on the material the tab end of the blank is held just as rigidly in place as the rest of the blank. In case the material or the style of folding is such as to require no special pressure or present no special thicknesses the die will be employed, as shown in Figs. 11 and 12.

Referring further to Figs. 19 and 20, it will be seen that the bed-plate $a^2$ conforms in shape to the shape of the collar, having projecting ends $a^9$ extending under the end blades for the latter to rest on when out of folding position, this bed-plate having extension-blocks $a^{10}$ at its middle portion, so that it may be accommodated to different sizes of collars. This special bed-plate I regard as of considerable importance, as it enables me to fold all the sizes of any style of collar with one plate, it being necessary merely that the long edges of the bed-plate should conform to the shape of the blades and of the collar to permit the blades to drop, as previously explained.

I have already quite fully described the operations of my machine in the course of the above description of the construction, and therefore it will be sufficient to designate at this point merely certain general features of operation. The two end blades are first moved simultaneously forward under a light initial pressure succeeded by a heavy creasing pressure due to the differential-pressure mechanism and are then instantly retracted, all these movements being accomplished with exceeding rapidity in order that the dampened blanks, which, it will be borne in mind, are resting on a heated surface, may not dry out before the folding operations of all the blades have been accomplished. The end folds having been made and creased, the die is moved diagonally forward out from under these folds, raised sufficiently to clear them, and then restored, the springs giving a rapidity of movement not possible with other mechanism, so that the die is again in place on top of said end folds ready for the front edge fold, and the latter is made in an inappreciable time. It will be observed that the end folds include the tabs of the collar-blank shown, this square-cornered fold (see Figs. 11 and 14) being accomplished by having one edge, herein shown as the edge $x$, Fig. 14, of the angularly-shaped blade arranged nearer to the adjacent edge of the die than are the other folding edges of the blade, the result being that as the blade moves along its diagonal path toward the die the said nearer edge $x$ makes its part of the fold before the other portions of the fold are made, and particularly before the extreme end of the tab is folded, so that when the latter is folded by the portion $y$, Fig. 14, of the blade the fabric previously folded over by the part $x$ of the blade is neatly lapped over in a corner fold, substantially as shown in Fig. 11. The front edge fold having been made, the die is moved diagonally rearward into its third position, (shown in Fig. 12,) thereby not only getting the die out from under the front fold, but at the same time placing it properly for the back fold without requiring any compound movements of the die, and thereupon the back blade moves forward to make the back fold, accomplishing this in substantially the same manner as the front fold was formed, both of said folds being made with a differential pressure, as already explained, while absolute permanence of position is secured during each of the folding operations by the pinching-fingers $f^7$, it being also understood that the holders $b^3$ keep their original position, holding the cloth down and without movement while all the various movements of the die take place.

I have aimed in this machine to make the folding movements, and, indeed, all the movements, as quick as possible without sacrificing accuracy, and I have also endeavored to make it impossible for the folding-knives to shift the fabric out of place.

It will be understood that while I have described a certain sequence of folding operations the order may be varied—as, for example, the die may have its initial position, as shown in Fig. 12, the back fold being made first and then the die moved diagonally forward for the end folds and farther forward and back again for the front edge fold.

I have purposely omitted various details which do not constitute essential features of my invention, although they are contained in the completed machine—such, for instance, as the belt-shifting mechanism, treadle or knee levers, &c.

It will be evident to those skilled in the art that very many changes, modifications, and substitutions may be made without departing from my invention, and I therefore wish it understood that I am in no wise limited to the details of construction herein shown and described, nor am I otherwise limited than as expressed in the claims.

Having described my invention, what I claim, and desire to secure by Letters Patent, is—

1. In a machine for folding collars and the like, a former or die having one edge conforming to the desired shape of the article to be folded at that edge, and having an adjacent folding edge cut away, or set back from the end of said other edge of the die at said corner, substantially as and for the purpose described.

2. In a machine for folding collars and the like, a former or die having one edge conforming to the desired shape of the article to be folded at that edge, and having an adjacent edge cut away, or set back from the end of said other edge of the die at said corner, and means for folding the material at one of said edges and then moving the die diagonally thereto for folding the material at the other of said edges, substantially as described.

3. In a machine for folding collars and the like, a former or die including two end parts, each having one edge conforming to the desired shape of the article to be folded at that edge, and having an adjacent edge cut away, or set back from the end of said other edge of the die at said corner, the said cut-away or set-back portions of said two parts constituting the side folding edges, said parts being movable toward and from each other, substantially as described.

4. In a machine for folding collars and the like, a former or die including two end parts, each having one edge conforming to the desired shape of the article to be folded at that edge, and having an adjacent edge cut away, or set back from the end of said other edge of the die at said corner, said parts being movable toward and from each other, and means for folding the blank over one of the corresponding edges of said two parts and then moving the die diagonally thereto, for folding the blank over the other of said edges of said parts, substantially as described.

5. In a machine for folding collars and the like, a die, and mechanism to move it, combined with a folding-blade for folding the edge of a blank over said die, said blade being movable into a position below said die, to permit the latter to be shifted without interference therewith, said moving mechanism including means for shifting the die in a substantially horizontal plane over the blank and out over the said depressed blade, substantially as described.

6. In a machine for folding collars and the like, a bed to receive blanks to be folded, a die to rest on said blanks, a folding-blade to fold said blank, said bed having a recess to receive said blade below the normal plane of said die, and means to shift the die over said bed and its recess in an approximately horizontal plane, substantially as described.

7. In a machine for folding collars and the like, a bed to receive blanks to be folded, a movable die to rest on the blanks, means to fold the blanks, and means to shift said die from under a fold in a plane of movement substantially parallel to said bed, and mechanism to thereafter raise the die and shift it back again, above the fold just made, substantially as described.

8. In a machine for folding collars and the like, a die for holding the blanks to be folded, folding-blades for folding four edges of the blank, and means to shift said die by two movements for forming all of said edge folds, said construction being capable of coöperating for the entire folding by two shifting movements of said die, substantially as described.

9. In a machine for folding collars and the like, a die for holding the blanks to be folded, folding-blades for folding four edges of the blank, and means to shift said die by two movements for forming all of said edge folds, said movements being a collapsible movement out and back from beneath the end folds, the die being restored on top of said end folds, leaving the die in position for forming one of the edge folds, and a movement away from said edge fold, leaving the die out from under said edge fold and in position for forming the opposite edge fold, substantially as described.

10. In a machine for folding collars and the like, a die for holding the blanks to be folded, folding-blades for folding four edges of the blank, and means to shift said die by two movements for forming all of said edge folds, said die having a third movement for entirely disengaging it from the folds of the blank, substantially as described.

11. In a machine for folding collars and the like, a die to rest on the blanks to be folded, folding-blades to do the folding, means to shift said die, a holder for maintaining the blanks in position while the die is shifted, and mechanism pressing said holder on the material during the said shifting of the die, substantially as described.

12. In a machine for folding collars and the like, a die having adjacent its opposite ends cut-away portions, folding-blades to do the folding, holders occupying said cut-away portions, and mechanism normally holding said holders yieldingly below the die, substantially as described.

13. In a machine for folding collars and the like, a bed, a cross-head movable toward and from the same, a die carried by said cross-head, means for moving said die relatively to the cross-head, said die having openings or cut-away portions, and holders supported in fixed relation to the movements of said die, said holders entering said openings and being held yieldingly normally below the die, substantially as described.

14. In a machine for folding collars and the like, a die, a movable support therefor, folding-blades, said die being movable up and down in said support, means for moving it positively down, and spring mechanism for moving it up, substantially as described.

15. In a machine for folding collars and the like, a die, a support therefor, folding-blades coöperating with the die, said die having reciprocal movement longitudinally, transversely, and vertically in said support, positive means for giving one of said reciprocal movements, and spring means for the return part of the reciprocal movement, for producing exceedingly quick action, substantially as described.

16. In a machine for folding collars and the like, a bed, folding-blades operating on said bed, a shiftable die or former, means for raising and lowering said die to coöperate with said blades, gearing for operating said blades for infolding the edges of blanks, and a rotary shaft and cams connected with and operated by said gearing for shifting said die, said gearing rotating said shaft and cam in one direction only, and said shaft and cam effecting the said shifting of said die by said unidirectional rotation without reverse rotation, substantially as described.

17. In a machine for folding collars and the like, a die for forming the blanks to be folded, mechanism to move said die, said mechanism including means for shifting the die from beneath one fold of the said blank into position for an opposite fold of said blank by a single movement, and folding-blades to make said two folds, substantially as described.

18. In a machine for folding collars and the like, a folding-blade comprising a blade proper, a guide therefor having a guideway in which said blade moves in folding, movable means carrying said guide, and operating mechanism for reciprocating said blade in said guideway, and means for intermittingly moving said carrying means, substantially as described.

19. In a machine for folding collars and the like, a blade, a guide having a guideway in which said blade reciprocates, a carrier for said guide, a support pivotally sustaining said mechanism, and means for reciprocating said blade in said guideway, and means for intermittingly depressing said support on its pivot, substantially as described.

20. In a machine for folding collars and the like, a hanger, a block therein, a blade pivotally connected with said block, and means for adjusting said block in said hanger to vary the tip of said blade, substantially as described.

21. In a machine for folding collars and the like, a hanger, a folding-blade sustained thereby, means for moving said blade, and means for varying the angle or tip of the blade transversely of its said movement, substantially as described.

22. In a machine for folding collars and the like, a blade, a guide having a guideway in which said blade reciprocates, a carrier for said guide, said guide having a swinging adjustment on said carrier, a support pivotally sustaining said mechanism, and means for reciprocating said blade in said guideway, substantially as described.

23. In a machine for folding collars and the like, a folding-blade supported to move up and down, a pressure-arm for intermittingly engaging said blade, and means for positively depressing said pressure-arm at times on said blade, substantially as described.

24. In a machine for folding collars and the like, a folding-blade, and a differential pressure device for automatically giving said blades different degrees of pressure in its folding operation, substantially as described.

25. In a machine for folding collars and the like, a folding-blade, a pressure device therefor, operating mechanism intermittingly depressing said blade, and a spring tending to lift said blade against the action of said pressure device, substantially as described.

26. In a machine for folding collars and the like, a pivoted folding-blade, means to move it forward for folding, means for permanently adjusting the pivot-point vertically at the rear end of the blade, and means to swing down the front end of the blade on its said pivot, substantially as described.

27. In a machine for folding collars and the like, a folding-blade to fold over and rest on the edge of a blank, means for moving the blade forward to make a fold, and means independent of and unconnected with the blade for bringing pressure on said blade independent of its said forward movement, substantially as described.

28. In a machine for folding collars and the like, a pressure device including a rod carrying two springs, one lighter than the other, the light spring being secured at one end to the rod, a lever on said rod engaging the other end of the lighter spring and in position to compress the heavy spring, substantially as described.

29. In a machine for folding collars and the like, a pressure device including a rod carrying two springs, one lighter than the other, the light spring being secured at one end to the rod, a lever on said rod engaging the other end of the light spring and in position to compress the heavy spring, and a cam for operating said lever, substantially as described.

30. In a machine for folding collars and the like, a folding-blade to fold over and rest on the edge of a blank, means for moving said blade in and out, and a spring for moving the front edge of said blade up and positive means for moving it down, substantially as described.

31. In a machine for folding collars and the like, a folding-blade, and power mechanism for operating it, said operating mechanism including a connection for giving the folding edge of the blade a yielding downward movement, substantially as described.

32. In a machine for folding collars and the like, a blade pivoted to swing in the path of an arc, said blade when in folding position being normally held substantially in the plane of the blanks, yielding supporting means for the blade, and means to swing the blade forward, the forward movement of the blade cooperating with said pivotal movement and bringing pressure on the blade through said yielding support, substantially as described.

33. In a machine for folding collars and the like, a folding-blade, and operating means therefor, said means including a shaft having a loose part and a fixed part thereon, a spring on said shaft secured at its ends respectively to said fast and loose parts, and an arm for intermittingly rotating said shaft against the tension of said spring, substantially as described.

34. In a machine for folding collars and the like, a folding-blade, and operating means therefor, said means including a shaft having a loose part and a fixed part thereon, a spring on said shaft secured at its ends respectively to said fast and loose parts, and an arm for intermittingly rotating said shaft against the tension of said spring, said arm being loosely mounted on said shaft adjacent said fixed part, one having a spur and the other a recess larger than said spur, to engage the latter at times for rotating said shaft, substantially as described.

35. In a machine for folding collars and the like, a folding-blade supported on a shaft, said shaft being mounted to turn in the free end of a pivoted support, means for swinging said pivoted support, said shaft carrying a heavy spring and a light spring having their opposite ends secured in the free ends of said pivoted support, a collar fixed on said shaft and having one end of the light spring fixed thereto, an arm loose on said shaft next said collar and having one end of said heavy spring fixed thereto, said collar and arm being loosely interlocked, and means for operating said arm, substantially as described.

36. In a machine for folding collars and the like, a bed to receive blanks to be folded, folding-blades for folding the blanks, a pinching device, and means for intermittingly pressing down said pinching device for preventing the shifting of the blanks during folding, substantially as described.

37. In a machine for folding collars and the like, a bed to receive blanks to be folded, folding-blades for folding the blanks, a die for holding the blanks, a pinching device above said die, and means for intermittingly pressing down said pinching device on said die, to prevent the blanks from shifting during folding, substantially as described.

38. In a machine for folding collars and the like, a bed to receive blanks to be folded, folding-blades for folding the blanks, a die for holding the blanks, certain of said blades making their folds before others of said blades, means for moving said die between said folding operations, a pinching device above said die, and means for depressing said pinching device after each movement of said die, for preventing the shifting of the blanks by the subsequent folding movement of the blades, substantially as described.

39. In a machine for folding collars and the like, a bed to receive blanks to be folded, blades for folding said blanks, pinching devices for pinching or pressing down the blanks adjacent their corners, and means for intermittingly pressing down said pinching devices to prevent the blanks being shifted during folding, substantially as described.

40. In a machine for folding collars and the like, a bed for receiving blanks to be folded, a die for holding the blanks on said bed, a portion of said bed having a yielding surface to compensate for a thin place in the blank adjacent a thick place both of which are to be folded, said yielding surface normally extending in a plane slightly above the level of the receiving-bed, whereby said thin place is held under and by said die with a firm grip the same as the thicker portions of the blank, and means for folding the blank while so held, substantially as described.

41. In a machine for folding collars and the like, a bed for receiving blanks having tab ends to be folded, a die for holding the blanks in place, said bed having at the part on which the tab end rests a yielding surface corresponding in shape substantially to the tab end and normally extending slightly above the plane of the receiving-surface of the bed, substantially as described.

42. In a machine for folding collars and the like, a bed for receiving blanks to be folded, a die for holding the blanks on said bed, a portion of said bed-surface being yielding to compensate for a thin place in the blank, said yielding portion of the surface having a rough upper surface to grip the goods and normally extending in a plane slightly above the level of the receiving-bed, whereby said thin place is held under and by said die with a firm grip the same as the thicker portions of the blank, and means for folding the blank while so held, substantially as described.

43. In a machine for folding collars and the like, a bed for receiving blanks to be folded, a die for holding the blanks on said bed, a portion of said bed at a thin spot in the blanks or a part of the blanks likely to be shifted out of proper position having a spring-plate fixed thereto for retaining the said part of the blanks in place for proper folding, said spring-plate normally extending in a plane slightly above the level of the receiving-bed, substantially as described.

44. In a machine for folding collars and the like, a stationary bed-plate, a folding-blade to fold a blank on said bed-plate, a former to hold the blank on said bed-plate, said former and said bed-plate at one edge conforming in shape to the edge of the folding-blade, mechanism for shifting said former laterally over and close to said bed-plate and said edge, said folding-blade being movable below the receiving-surface of the bed-plate at said edge, out of the way of said shifting former, substantially as described.

45. In a machine for folding collars and the like, a bed-plate, opposite folding-blades, said bed-plate at its opposite edges conforming in shape and width to the folded article, and projecting upward with a free space at said sides, permitting the said opposite blades to drop thereat, substantially as described.

46. In a machine for folding collars and the like, a bed-plate mounted on said machine and projecting in relief to receive the blanks thereon, said bed-plate conforming in shape to the folded article on one or more edges and coinciding thereat with the folding-lines, and projecting at one or more of the remaining edges beyond the folding-lines of the machine, and means for folding said article at a plurality of edges, substantially as described.

47. In a machine for folding collars and the like, a frame, a bed-plate thereon conforming in general to the shape of the folded article and projecting in relief to receive and support the blanks to be folded, said bed-plate comprising two main parts movable toward and from each other for different sizes of blanks, substantially as described.

48. In a machine for folding collars, and the like, a frame, a bed-plate thereon for receiving collar-blanks on top of it, said bed-plate comprising two main portions, each conforming on its opposite long edges to the shape of the corresponding edges adjacent the ends of the collar, said plate projecting in relief to receive on its upper surface the blanks to be folded and being adjustable for different sizes, substantially as described.

49. In a machine for folding collars and the like, means to receive a blank to be folded at two adjacent edges to make a corner, and means for engaging the blank and occupying a position above the blank at said corner and having its part at said corner independently yielding to permit its contiguous portion to rest firmly down on a fold adjacent said corner without being held up by the plurality of folds at the corner of the blank, substantially as described.

50. In a machine for folding collars and the like, means to receive a blank to be folded, and a folding-blade, said folding-blade having a yielding portion at its folding edge for riding up on a thick fold without lifting the adjacent edge portion of the blade, said yielding portion permitting said adjacent edge portion of the blade to rest firmly upon the thinner fold of the blank, substantially as described.

51. In a machine for folding collars and the like, means to receive a blank to be folded, folding-blades to fold the blank at a corner, one of said blades having an independent piece at its corner, a spring normally holding said piece in the same plane with the rest of the blade, and means for moving said blade into folding engagement with the blank after said corner has been partly folded, said independent piece riding up on the thicker portion of the fold at the corner, and the rest of the blade maintaining proper engagement with the thinner fold of the blank, substantially as described.

52. In a machine for folding collars and the like, means to receive a blank to be folded, a die to hold the blank, means to move said die into holding engagement with said blank after a corner has been folded, said die having its corner independently yielding above said corner of the blank, substantially as described.

53. In a machine for folding collars and the like, a bed to receive a blank to be folded, a die to hold the blank, and folding-blades for infolding the blank, said die having one or more yielding corners to yield at corresponding corners of the blank in resting thereon, and said folding-blades having one or more yielding corners to yield at other corners of the blank, substantially as described.

54. In a machine for folding collars and the like, means to receive a blank to be folded, a folding-blade for folding a projecting portion or angle of the blank, said blade having a slight depression in its engaging surface parallel to the receiving-surface to compensate for the increased thickness of material at the said fold, substantially as described.

55. In a machine for folding collars and the like, means to receive a blank to be folded, a folding-blade for folding a projecting portion or angle of the blank, said blade having a slight depression in its engaging surface to compensate for the increased thickness of material at the said fold, and a yielding pressing member carried by said depression, substantially as described.

56. In a machine for folding collars and the like, means to receive a blank to be folded, a folding-blade for folding a projecting portion or angle of the blank, said blade having a flat spring portion in its engaging surface to compensate for the increased thickness of material at said corner, substantially as described.

57. In a machine for folding collars and the like, means to receive a blank to be folded, a folding-blade for folding a projecting portion or angle of the blank, said blade having a flat spring portion in its engaging surface to compensate for the increased thickness of material at said corner, said spring portion being deflected slightly upward at the front edge of the blade, substantially as described.

58. In a machine for folding collars and the like, a stationary bed to receive a blank, a die, and mechanism to move it, combined with a folding-blade for folding the edge of the blank over said die, said blade being slidingly movable into a position to rest beneath the projecting edge of the blank prior to folding the blank, substantially as described.

59. In a machine for folding collars and the like, a bed to receive a blank to be folded, means to fold the blank, a holding device pressing on the interior portion of the blank away from the edges, and mechanism automatically pressing down said holding device, substantially as described.

60. In a machine for folding collars and the like, a bed to receive a blank to be folded, a die to hold the blank, and means for holding the blank down independent of the die, and mechanism operating said holding means independently of the die, substantially as described.

61. In a machine for folding collars and the like, a bed to receive a blank to be folded, a collapsible die for holding the blank, said die descending upon the blank in extended position and being collapsed for withdrawal from the folds, folding mechanism to infold the edges of the blank, and means to move the die straight up from and in a path perpendicular to said bed, substantially as described.

62. In a machine for folding collars and the like, a bed to receive a blank to be folded, a die for holding the blank during its folding, folding-blades, and shifting mechanism moving said die laterally and vertically into and out of defining position on the blank, said mechanism including mechanism for raising said die over the partially-folded blank and for lowering the die straight down in a path perpendicular to the bed, for preventing the die from disturbing the folds made, substantially as described.

63. In a machine for folding collars and the like, a bed to receive a blank to be folded, a die for holding the blank, folding mechanism to infold the edges of the blank, and automatic means to move the die laterally and straight up and straight down directly from and in paths perpendicular to said bed, substantially as described.

64. In a machine for folding collars and the like, a cross-head, a die and a rotary shaft for operating it, carried by said cross-head, folding-blades, a driving-shaft, gear-wheels between said driving-shaft and said die-operating shaft, said gear-wheels and shafts being connected to operate all the parts of the machine by rotation in one direction only, and means for intermittingly disconnecting said die-operating shaft from driven engagement with said gears, substantially as described.

In testimony whereof I have signed my name to this specification in the presence of two subscribing witnesses.

ALBERT D. FENWICK.

Witnesses:
GEO. H. MAXWELL,
GEO. W. GREGORY.